J. A. J. W. PARKER.
Plow.
No. 219,509.  Patented Sept. 9, 1879.
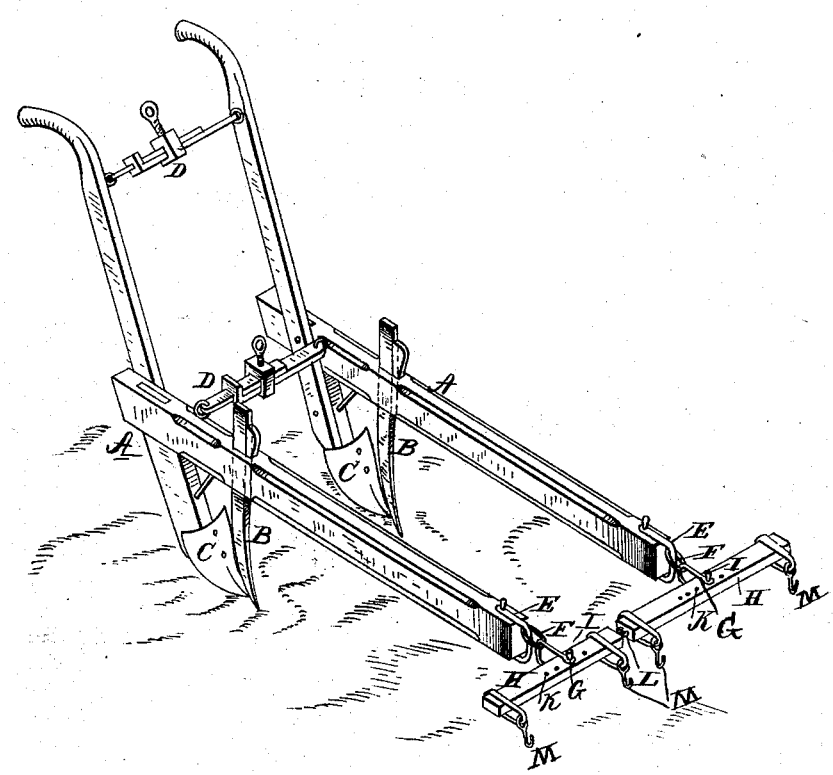
WITNESSES
Franck L. Ouraud
J. McNamee
INVENTOR
J. A. J. W. Parker
By H. J. Ennis
ATTORNEY.

UNITED STATES PATENT OFFICE.

JOSEPH A. J. W. PARKER, OF WHITEVILLE, TENNESSEE.

IMPROVEMENT IN PLOWS.

Specification forming part of Letters Patent No. 219,509, dated September 9, 1879; application filed August 1, 1879.

*To all whom it may concern:*

Be it known that I, JOSEPH A. J. W. PARKER, of Whiteville, in the county of Hardeman and State of Tennessee, have invented certain new and useful Improvements in Plows; and I do hereby declare that the following is a full, clear, and exact description of the invention, which will enable others skilled in the art to which it appertains to make and use the same, reference being had to the accompanying drawing, and to the letters of reference marked thereon, which form a part of this specification.

This invention relates to certain improvements in cultivators of that class in which two connected plows are employed to straddle a row and furrow and upturn the soil on each side of the same; and it has for its object to provide a means for adjusting the position of the plows relative to each other, and to equalize the draft upon said plows, as more fully hereinafter specified.

To this end the invention consists in the combination, with the two plows, secured together by adjustable connections, of two whiffle or single trees, loosely secured, by means of adjustable connections, to the clevises of the respective plows, the said single-trees being connected at their adjacent ends to each other, and provided with trace-hooks at or near each end, to which the traces may be secured, as more fully hereinafter set forth.

The drawing represents a perspective view of my improved cultivator, in which—

The letter A indicates the two plows, provided with the mold-cutters B and plowshares C, which may be of the ordinary or any approved construction. The said plows are connected together by means of the adjustable connections D, by means of which the distance between the two may be regulated at will to adapt the cultivator to the work desired.

To the clevis E of each plow is secured, by means of a link, F, a U-shaped connecting-piece, G, the ends of which are adapted to embrace the whiffle or single trees H, and are secured to the same by means of screw-bolts I, which pass through said whiffle or single trees.

The whiffle or single trees are each provided with a series of apertures, K, through which the bolts I may be passed, in order to adjust the forward ends of the plows to correspond with the adjustment of the connections D, and said whiffle or single trees are loosely connected at their adjacent ends by means of the interlocking eyes L, so that the draft upon one will be communicated to the other.

The letter M indicates the trace-hooks, which are secured at or near each end of the whiffle or single trees, to which the traces of the draft-animals are attached.

In order to equalize the draft upon the respective plows, the inner traces of the draft-animals are crossed, the inner trace of one animal being connected to the inner trace-hook of the whiffle or single tree of the other animal, and vice versa; and as the two whiffle or single trees are connected at their adjacent or inner ends it will be perceived that any overstrain caused by one animal on its whiffle or single tree will be distributed to the other whiffle or single tree, and by this means a uniform draft will be given to the plow.

Having thus described my invention, what I claim, and desire to secure by Letters Patent, is—

The combination, with the adjustably-connected plows, of the whiffletrees adjustably secured to the clevises of the same, flexibly connected at their adjacent ends, and provided with trace-hooks at each end, substantially in the manner and for the purpose set forth.

In testimony that I claim the foregoing as my own I hereunto affix my signature in presence of two witnesses.

JOSEPH A. J. W. PARKER.

Witnesses:
B. F. BRADFORD,
GEO. G. ADAMS.